(12) United States Patent  
Escher

(10) Patent No.: US 6,801,201 B2  
(45) Date of Patent: Oct. 5, 2004

(54) METHOD FOR CHART MARKUP AND ANNOTATION IN TECHNICAL ANALYSIS

(75) Inventor: Richard E.A. Escher, Ottawa (CA)

(73) Assignee: Recognia Incorporated, Ottawa (CA)

(*) Notice: Subject to any disclaimer, the term of this patent is extended or adjusted under 35 U.S.C. 154(b) by 105 days.

(21) Appl. No.: 10/320,367

(22) Filed: Dec. 17, 2002

(65) Prior Publication Data

US 2003/0131315 A1 Jul. 10, 2003

Related U.S. Application Data

(60) Provisional application No. 60/339,774, filed on Dec. 17, 2001.

(51) Int. Cl.$^7$ .............................................. G06T 11/20
(52) U.S. Cl. ....................................... 345/440; 705/36
(58) Field of Search ............................. 345/440, 440.1, 345/440.2; 705/36, 37, 7, 10, 12

(56) References Cited

U.S. PATENT DOCUMENTS 6,008,817 A  * 12/1999 Gilmore, Jr. ................ 345/440

6,628,285 B1 * 9/2003 Abeyta et al. .............. 345/441

OTHER PUBLICATIONS

2003/0065607 A1, Satchwell, Apr. 3, 2003.*

* cited by examiner

*Primary Examiner*—Matthew Luu  
(74) *Attorney, Agent, or Firm*—L. Anne Kinsman; Borden Ladner Gervais LLP

(57) ABSTRACT

A method for generating markup information and annotating a time series chart to display recognized pattern formations. Pivot points in the time series are identified and categorized. The pivot points are then analyzed to recognize desired pattern formations. The time series is then graphically displayed with the pivot points marked and labeled. Lines drawn between the pivot points display the recognized pattern to a user. Breakout (trend) lines can also be included. The time series can include time series of financial data, such as stock prices, medical data, such as electrocardiogram results, or any other data that can be presented as a time series, and in which it is desirable to identify turning points, trends, formations or other information.

13 Claims, 4 Drawing Sheets

METHOD FOR CHART MARKUP AND ANNOTATION IN TECHNICAL ANALYSIS

This application claims the benefit of priority from U.S. Provisional Application No. 60/339,774, filed Dec. 17, 2001.

FIELD OF THE INVENTION

The present invention relates generally to technical analysis. More particularly, the present invention relates to a method of chart markup and annotation in technical analysis.

BACKGROUND OF THE INVENTION

Technical financial analysis, as opposed to fundamental analysis, uses the past price, volume activity, or other measures of a stock, or of a market as a whole, to predict the future direction of the stock or market. Technical analysis can also be applied to other time series such as medical data, electrocardiogram results, or any other data that can be presented as a time series, and in which it is desirable to identify turning points, trends, formations or other information. The results of a technical analysis are usually shown in charts or graphs that are studied by technical analysts to identify known trends and patterns in the data to forecast future performance. Recognizing patterns in the charts and graphs is greatly enhanced by efficient pattern recognition and automated chart annotation.

A number of terms of art are used in the present specification. An inbound trend is a series of higher highs or lower lows that lead into a price pattern. An indicator is a calculation based on stock price and/or volume that produces a number in the same unit as price. An example of an indicator is the moving average of a stock price. An oscillator is a calculation based on stock price and/or volume that produces a number within a range. An example of an indicator is the moving average convergence/divergence (MACD). A price chart is a graph of a company's share price (Y-axis) plotted against units of time (X-axis).

The terms technical event, and fundamental event are coined terms to denote points such as the price crossing the moving average or the MACD crossing the zero-line. The technical event or fundamental event occurs at a specific point in time. The importance of most indicators and most oscillators can be represented as technical events. A technical event, as used herein, is the point in time where a stock price has interacted (e.g. crossed or bounced) with an indicator or a price pattern or an oscillator has crossed a threshold. There are other techniques that technical analysts use to interpret price history as well that can be represented as technical events. These, however, are more subjective and involve the subjective recognition of price formations or price patterns. Fundamental events are the point in time where a stock price has interacted (e.g. crossed or bounced) with a price value computed from company accounting and/or other economic data.

A price formation, price pattern or chart pattern is a pattern that indicates changes in the supply and demand for a stock, which cause prices to rise and fall. Over periods of time, these changes often cause visual patterns to appear in price charts. Predictable price movements often occur follow price patterns. A reversal pattern is a type of price pattern that is believed to indicate a change in the direction of a price trend. If prices are trending down then a reversal pattern will be bullish since its appearance is believed to indicate prices will move higher. Examples of bullish reversal patterns include double bottoms and head and shoulder bottoms. Similarly, if prices are trending up then a reversal pattern will be bearish. Examples of bearish reversal patterns include double tops and head and shoulder tops.

Graphs of time series, for example financial time series, sometimes exhibit specific formations prior to moving in a particular direction. Some relevant price formations have been described by a number of authors, including Edwards, R. D. and Magee, J. "Technical Analysis of Stock Trends" ISBN 0-8144-0373-5, St. Lucie Press 1998 and Murphy, J. J. "Technical Analysis of the Futures Markets" ISBN 0-13-898008-X, New York Institute of Finance 1986. To anticipate the likely behaviour of some time series, it is advantageous to be able to recognise predictive formations as soon as they occur. Many predictive formations share a common characteristic of being capable of representation by a stylised zigzag line, or by connecting the pivot points of the zigzag lines. Explanations given in Murphy, supra, are largely framed around this concept.

One well-known technique in technical analysis is point and figure charting. In point and figure charting, the price of, for example, a stock is plotted as columns of rising X's and falling O's to denote price movement greater than, or equal to, a threshold amount, denoted a box size. Unlike other charting methods, such as open, high, low, close (OHLC), bar or candlestick, where price action is plotted according to time, point and figure charting is time independent and price, not time, dictates how point and figure charts take shape. For example, a series of volatile trading sessions over the course of a week could fill an entire page or screen in a point and figure chart, whereas a month of inactivity or static range trading might not be reflected on the chart, depending on the chosen box size. The box size determines how much background "noise" is removed from the price action, and, hence, the granularity of the resulting chart. The factors that typically influence the choice of box size include volatility and the time horizon being examined.

The technique of conventional point and figure charting is described in detail in Kaufman, P. J. "Trading Systems and Methods" ISBN 0-413-14879-2, John Wiley & Sons 1996. In summary, a box size, datum price and datum time, are chosen. If a new high exceeds the sum of the current datum plus a box size, and X is written in a column and the datum price shifted to the datum plus box size. When the market reverses by more than some multiple of the box size, a column of Os is formed, and continues in a similar manner until the market reverses by more that the prescribed multiple of box sizes. One attractive feature of point and figure charting is the fact that conventionally accepted chart formations used in technical analysis, such as double tops and triangles, can be clearly identified. Buy signals can be generated when prices surpass a previous bottom pivot point by one or more boxes, and the reverse for sell signals. This eliminates much of the subjectivity of other analysis techniques. However, it is much easier for users to view the results of such a technical analysis on a conventional time-based chart.

Another technique also known is to use a neural net through which open-high-low-close-volume data (i.e. the data stream) flows to recognize pattern formations. If the incoming data stream represents a pattern that the neural net has been trained to recognize then a "switch" gets flipped by the data point in the stream that confirmed the pattern. At this point the neural net reports a numerical value that represents the level of certainty that it associates with the existence of the pattern. Thus, if it "sees" a pattern that it is less certain of the numerical value will be small (e.g. close to zero), whereas, if it seems a pattern it is sure of then the value will be high (e.g. close to one).

Given this simple view of a neural net, one can understand that the neural net has no knowledge of the position or scope of the pattern other than to say that it was confirmed at the point in time associated with the data point that triggered the switch. Thus, in order to obtain markup to annotate a pattern additional information or a different approach is required.

Currently, there is no way to automatically map the results of pattern recognition based on pivot point determination or neural net recognition to a conventional time series chart, and to provide relevant annotation based on the recognition. It is, therefore, desirable to provide a method for automatically generating markup and annotating a chart based on previously recognized patterns and trends in the underlying data.

SUMMARY OF THE INVENTION

It is an object of the present invention to obviate or mitigate at least one disadvantage of previous methods for charting in technical analysis. It is a particular object of the present invention to provide a method for generating chart markup and directly annotating a time series chart based on categorized pivot points and recognized patterns in the time series, particularly time series of financial data, such as stock prices.

According to a first aspect, there is provided a method for generating markup for annotating a chart of time series data. A rich feature set of technical event data related to the time series data is stored in a database. The rich feature set includes identification of pivot points in the time series data, pattern recognition data derived from the identified pivot points, and rating and quality assessments derived from the pattern recognition data, the identified pivot points and the time series data. The method comprises receiving, from a client, a request for markup information related to an event. Features associated with the event are then selected from the rich feature set. Markup tags are then determined in accordance with the selected features, and the markup tags are assembled, in accordance with a markup format, to generate a markup block for the event. The markup block contains the requested markup information. The markup is then sent to the client. Feature selection rules and markup rules are generally predetermined in accordance with pattern type and time series data type.

In a further embodiment, the method includes displaying the time series as a chart at the client location, and annotating the chart in accordance with the markup information. The method can also include analyzing and manipulating the markup information at the client. The client can also specify a desired format for the markup information in the initial request. Preferably, the markup information is initially provided as an XML block, and then transformed, if desired, into any other desired format, such SOAP, MS Excel, MS Word, ICE or HTML. Typically the features are also selected in accordance with the request.

In a further aspect, the present invention provides a method for generating markup for annotating a chart of time series data having an associated rich feature set as described above. The method comprises selecting features associated with an event from the rich feature set; determining markup tags in accordance with the selected features; and assembling the markup tags, in accordance with a markup format, to generate a markup block for the event.

In yet another aspect, the present invention provides a method for annotating a time series chart. The method first comprises receiving time series data for formation recognition; identifying pivot points in the time series data; performing formation recognition based on the identified pivot points to provide formation recognition data; and characterizing the time series data and rating the formation recognition data to provide characterization data. A rich feature set based on the time series data, the pattern recognition data and the characterization data is then stored in a database. A request for markup information for a chart based on the time series data is then received from an outside client. To provide the markup information, features are selected from the rich feature set and markup tags are determined in accordance with the selected features. The markup tags are then assembled, in accordance with a predetermined markup format, to generate a markup block. The markup block, containing the requested markup information, is then sent to the client.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Figure 1:
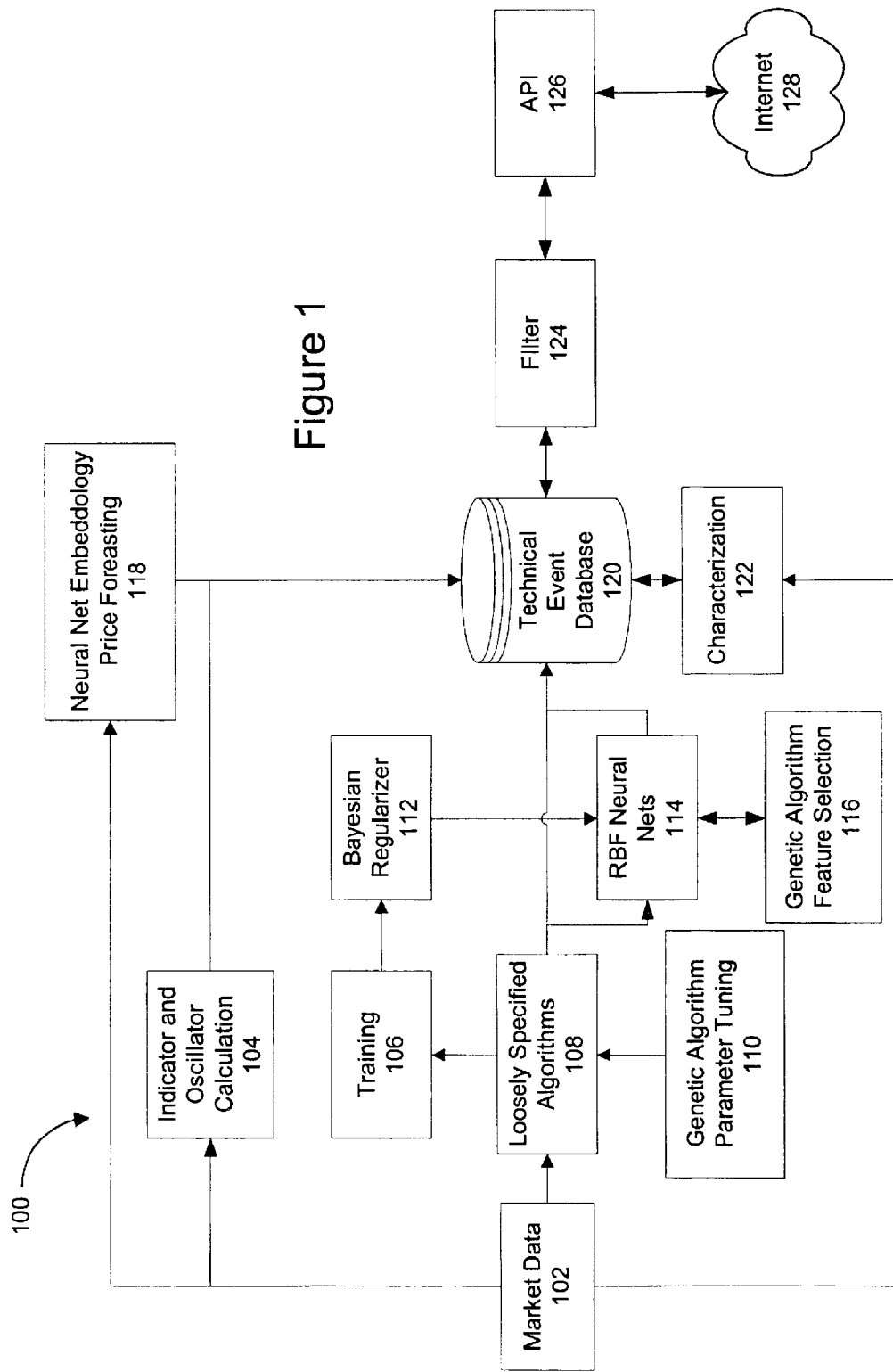
FIG. 1 is a block diagram of a system according to the present invention.

Generally, the present invention provides a method for generating chart markup and automatically annotating a chart in the technical analysis of a time series. The time series can include time series of financial data, such as stock prices, medical data, such as electrocardiogram results, or any other data that can be presented as a time series, and in which it is desirable to identify turning points, trends, formations or other information. The annotation method builds upon a modified point and figure technique as described in U.S. patent application Ser. No. 10/245,240, filed Sep. 17, 2002, the contents of which are incorporated herein by reference.

Generally, the modified point and figure technique determines the pivot, or turning points, and categorizes them according to the box size at which they appear, while associating time, or lag, information with each identified point. The point and figure charting is applied backwards (i.e. start from the end of a time series and work backwards) using progressively decreasing box sizes, and noting the box size at which a turning point first appears on a point and figure chart. The box size provides a measure of a turning point's spatial importance, and so spatial categorization is achieved. Unlike conventional point and figure methods, exact time series values, and lags from the end, are recorded for extreme values associated with each column. The pivot point categorization creates a rich data set for subsequent formation recognition by associating both spatial importance, i.e. the box size index, and time data, i.e. the lag, with each identified pivot point.

Prior to the actual point and figure charting, the method of categorizing pivot points begins with a spatial categorization of a candidate time series. First, the time series is defined, usually by taking some point of interest from a larger series (henceforth called the "end point") and a suitable number of prior values to define a search period. The lag of each point with respect to the end point is determined, i.e. the end point has lag=0, the first prior point has lag=1, the second prior point has lag=2, etc.

The maximum and minimum spatial values, MaxY & MinY, of the time series are then determined. The use to which any recognised formation is to be put will normally involve some minimum spatial value. In the example of a price-time series, this will often be a minimum price move that makes a trade worth taking. Some minimal spatial value is, therefore, defined, which will normally be dependent on the intended use of the result. To determine MaxY, the maximum and minimum prices within a search period are found. MaxY is half the difference between these maximum and minimum prices.

Intrinsic noise, INoise, in the time series is then estimated. One way of determining the intrinsic noise is to construct a centred moving average and then find the standard deviation of fluctuations around that average, through the time series. A minimum increment, MinInc, of box size is defined. This can be a multiple or fraction of the minimum spatial value defined above, and is generally dependent on the resolution desired for turning point categorization. Limits for box sizes can then be determined. Point and figure charts have to be created for discrete box sizes, so it follows that suitable limits can be expressed in terms of the number of discrete increments that make up a box. In terms of pseudo code, suitable limits are: trunc(0.5*(MaxY−MinY)/MinInc+1) and trunc(INoise/MinInc+1), for upper and lower limits respectively.

Using the determined upper and lower limits, point and figure charts can now be created, starting with high box sizes and working down to low box sizes in incremental steps. These point and figure charts may be forwards or backwards facing. For price formation recognition methods, backwards-facing charts are generally preferred.

For each box size, the data necessary to create a point and figure chart is determined. Moving backwards through the time series, any new extreme price movements in the same market direction are noted, together with their associated lag from the end. If the market reverses direction by more than a box size, a new column is created. The extreme value prior to the reversal, and its associated lag, define a turning point. Any turning point that has not been previously found is tagged with the box size, or, in a presently preferred embodiment, the number of increments of the box size, or box size index, for which it is first found and its lag from the end of the series. This results in a set of pivot points (turning points) categorized according to their spatial importance, and their relative time occurrence. While the following description assumes that the time series data includes both high and low values for each time period, continuous data can also be used, in which case the high and low for each time period are considered to be equal.

Generally, the present market direction of the final column, or breakout direction, of the point and figure chart is set. The breakout direction can be either upwards or downwards. In a bull trend, when a reversal formation is sought, the direction of the final column is set to downwards (i.e. a falling column). In the same bull trend, if a continuation formation is sought, the direction of the final column is set to upwards (i.e. a rising column). The opposite applies to bear trends. This means that for any given price record and box size, two different point and figure charts can be generated by the method of categorizing pivot points with the choice determined by the purpose to which the chart is to be used.

The above-described method can then be repeated at each desired box size, preferably from largest to smallest, and the first appearance of a pivot point, and the box size at which it appears can be noted. This results in the categorization of pivot points according to their relative spatial importance, which information can be used most advantageously in subsequent technical analysis formation recognition.

Using the identified and categorized pivot points, automated formation recognition algorithms can be applied to the data to discern patterns of interest. Formations of interest in technical analysis include, for example, triangles, diamonds, head and shoulders, double top, triple top, etc. Particular formation recognition methods for continuation triangles and reversal diamonds are described in U.S. patent application Ser. No. 10/245,263, filed Sep. 17, 2002, the contents of which are incorporated herein by reference. Using pivot points, it is also possible to recognize "rounded" patterns, such as rounded tops and bottoms, and "cup with handle" patterns. Recognizing such patterns involves centering a parabola on a pivot point and calculating least-squares fit to the time series data. A rounded pattern is recognized if the least squares fit is within predetermined error limits. Geometric considerations can also be used to fit adjacent parabolas together to recognize more complex curved patterns.

Once the pivot points have been identified and categorized, and the desired formations recognized from the pivot point data, the quality of the recognized patterns can be rated. One method of rating the quality of a recognized pattern formation is disclosed in U.S. Provisional Application No. 60/338,646, filed Dec. 11, 2001. This method uses a neural net to determine the quality of the pattern after it has been identified by a loosely specified algorithm (LSA).

LSAs can be applied to "watch" the incoming data stream to determine whether a particular pattern or patterns may be present in a specific set of data points. If an LSA finds a pattern then the "package" of data can optionally be routed to one or more families of neural nets for inspection with regard to its quality. The neural nets that the data gets routed to are specifically trained for the pattern or patterns that the LSA determines are present. The neural network then assigns a quality rating. The information determined by the pivot point identification and categorization, the LSA recognition, the neural net quality rating, and other sources, can be stored in a database as a rich feature set, and used to annotate the chart. The rich feature set includes formation type, pivot points defining the formation, dates associated with each pivot point, and trade volumes. Further features, also part of the rich feature set, can be calculated from this information, depending on the formation type. These calculated, or derived, values can include trend height, trend duration, threshold price, pattern height, symmetry, and statistical measures of formation quality, well known to those of skill in the art.

Once a pattern has been recognized and the rich feature set stored, the chart markup and annotation method of the present invention can be applied. Generally, the time series, or a portion thereof containing the recognized formation, is displayed as a graphical time series chart. The time series can be displayed as an OHLC, candlestick or bar chart, as desired. Since the pivot point data set contains both spatial and time data, the pivot points can be easily identified and marked on the displayed time series. Lines are then drawn between the pivot points to graphically display the recognized pattern, and the pivot points are labeled with the relevant spatial and/or time data, typically with their associated price and/or date.

FIG. 1 is a block diagram of a system 100, according to an embodiment of the present invention. System 100 consists of a number of interconnected modules, typically embodied as software modules. Market data module 102 provides market data, for example, daily stock market information such as high price, low price, open price, close price, volume, open interest and tick data values for stocks. The market data can be downloaded on a continuous, real-time basis directly from stock market providers, or can be sampled on a periodic basis, such as inter-day, daily or weekly. The market data can include data for a whole market, or data related to certain identified stocks. Market data module 102 feeds the market data to LSA module 108, which identifies candidate patterns at different window sizes. The identified candidate formations are written into a database 120 for further analysis. The LSA module 108 can also generate chart markup and annotation. Market data module 102 also feeds the market data to indicator and oscillator calculation module 104, a neural net embeddology price forecasting unit 118, and characterization module 122.

The calculation engine 104 computes, from the time series data, values, such as simple moving averages and RSI oscillator values, and writes the calculated values into the database 120. These are technical analysis calculations that are used to identify technical events. An example of a technical event is a closing price moving above its 200 day moving average. Another example is an RSI moving above 70.

The neural net embeddology price forecasting module 118 provides a further characteristic of a pattern. The price forecast indicates the expected price at some future time. These price forecasts are also written to the database 120. Embeddology price forecasting produces a series forecast of prices forward in time that are substantially statistically independent of patterns and technical events, as is known to those of skill in the art. This information is compared to the conventional price prediction determined by the geometry of the pattern. Other oscillators, such as relative strength, could also be used to support or deny the price movement predicted by the pattern.

The LSA module 108 is tuned by parameter tuning genetic algorithms in a genetic algorithm module 110. This is a periodic training activity. Genetic algorithms are used to select and weight the various parameters and rules used by the LSA module 108 to find candidate patterns. Candidate patterns recognized by the LSA module 108 can also be ranked by human experts as a periodic training activity. In this case, candidate patterns are shown to human experts who then rank or rate this information based on their experience. The ratings are then stored in training module 106. The information from the training module 106 is used by the Bayesian regularizer module 112. The Bayesian regularizer module 112 is a training file that is used to periodically update radial basis function (RBF) neural net module 114. The RBF neural net module 114 receives candidate patterns from the LSA module 108 and the RBF neural net module 114 determines an experiential rating for each candidate pattern. The experiential rating is, preferably, equivalent to the rating a human expert would give to the candidate pattern.

Genetic selection feature algorithm module 116 tunes the RBF neural net module 114. Again, this is a training activity that is performed periodically. RBF neural net ratings are also written to database 120. This is a number that indicates how a human expert would rate the candidate pattern. As will be apparent to those of skill in the art, the various training modules, such as the training module, genetic algorithm parameter tuning module, genetic algorithm feature selection module, and Bayesian regularizer module, can be excluded. In this case, the LSA module 108 and the RBF neural net module 114 are not periodically trained, and are instead provided with static algorithmic and statistical models.

The characterization engine 122 computes various characteristics for every candidate pattern found by the LSA module 108. The characterization engine 122 reads candidate patterns, indicators and oscillators from database 120, computes pattern and event characteristics and write results back to database 120. An example characteristic is the symmetry number. Symmetry is a measure of the similarity of the two halves of a pattern. For example, with a head and shoulder pattern, the symmetry number indicates how balanced the head is and how similar the left and right shoulders are to each other.

Patterns and event information, and characteristics are passed to filter 124 that screens output based on defined criteria. These can be supplied by the financial content provider who administers the system 100 or by a client such as a financial service provider or consumer. A filter 124 is defined for each user of the system 100. Filters 124 restrict the patterns passed out of the system 100 to ensure that patterns delivered meet certain minimum thresholds. For example, a filter may specify that only patterns of a high symmetry number are to be passed.

The final result of the complete analysis is the rich feature set of technical event data related to the time series data, which is stored in database 120. The rich feature set includes identification of pivot points in the time series data, pattern recognition data derived from the identified pivot points, and rating and quality assessment data derived from the pattern recognition data, the identified pivot points and the time series data.

External calls or requests (by a customer or external user) to the system 100 are managed by API 126, which interprets and executes the external command. The API 126 outside world is controlled by the API 126, for example through an internet, such as the Internet 128. The API 226 accepts calls, such as a call for markup information, from the outside world, passes the command to the internal system then returns the result in a requested format. In a presently preferred embodiment, the markup is initially provided in eXtensible Markup Language (XML). Using, for example, XSLT, which is a language for transforming XML documents, the XML markup can be transformed into other formats, such as SOAP, MS Excel, MS Word, ICE and HTML. The application programming interface API 126 makes the data available to the client side by accessing the database 120 through filters 124. On the client side, an application such as a financial service provider application can be used to communicate with the server side API and provide an interface, preferably a graphical user interface (GUI) for example, to consumers who access the financial service provider application.

At the heart of the present invention is the ability of API 126 to automatically generate markup of an identified formation, and provide chart annotation, in a requested format. When a request is received from a client for markup information related to an event (i.e. a selected portion of a time series, or a particular formation recognized in a given time series), features associated with the event are selected from the rich feature set. Markup tags are then determined in accordance with the selected features, and the markup tags are assembled, in accordance with a markup format, to generate a markup block for the event. The markup block contains the requested markup information. The markup is then sent to the client. Feature selection rules and markup rules are generally predetermined in accordance with formation, or pattern, type and time series data type. These rules can include rules for determining, for example, pattern duration (i.e. the time difference between the earliest and latest pivot points), and pattern height (i.e. the price difference between the lowest and highest priced pivot points). The rules can also include, for example, rules for selecting certain quality ratings, or for formatting a legend for display.

An event markup call is made to the API 126, the result of which is, for example, an XML block, or some other format specified by the user. The XML block contains sets of start and end points for the lines that are to be used to annotate a chart containing the specified event, according to the rich feature set determined for the specified pattern and its associated technical events. An exemplary XML markup block is shown below:

```
<markup type="event">
    <list count="n" type="line">
        <line chart="price" type=["pattern"|"trend"|" boundary"]>
            <start>
                <date>
                <price>
            </start>
            <end>
                <date>
                <price>
            </end>
        </line>
    </list>
    <list count="n" type="range">
        <range type=["event"|"trend"]>
            <name></name>
            <start></start>
            <end></end>
        </range>
    </list>
</markup>
```

The following are descriptions of the tags, all of which are derived from the rich feature set determined above:

<markup type="event">—The markup tag is the root tag. It contains the markup information for the event. The type attribute indicates the type of markup, i.e. type="event".

<list count="n" type="line">—The list tag is a container tag. The count attribute indicates the number of child tags (n will be the count) and the type attribute indicates the child tag type. The markup tag contains two list tags, one for lines and one for ranges.

<line chart="price" type=["pattern"|"trend"|"boundary"]>—The line tag contains the data for a line to draw on the chart. The chart attribute indicates which chart should be marked up. The chart attribute can have values: price, volume, RSI, momentum, and MACD. The type attribute indicates the type of line. The markup supports three different line types: pattern lines, trend lines, and pattern boundary lines. Pattern lines are those lines that appear inside the pattern and outline the price moves that formed the pattern. Trend lines are the lines that define a trend leading into the event. Boundary lines are the outside lines that define the limits of the event. Not all events have all of these line types and most events will have more than one of each type of line.

The line tag has 2 child tags, start and end. These tags mark the start and end points for the lines:

<start>—This tag contains the starting point for this line. Each starting point consists of a date and price tag.

<end>—This tag contains the ending point for this line. Each ending point consists of a date and price tag.

<date>—This tag contains the date value for this point. Dates are in YYYY-MM-DD format.

<price>—This tag contains the price value for this point.

<name>—This tag contains a text string describing the parent tag.

<range type=["date"|"price"]>—The range tag indicates a range that can be highlighted on a chart. The type attribute indicates if the range is a price or date range. A range tag has three child tags: name, start, and end. The name tag contains the name of the range. According to the example format, the API 126 indicates event and trend ranges. The start and end tags contain either a date tag if the range is a date range, or a price tag if the range is a price range.

Figure 4:
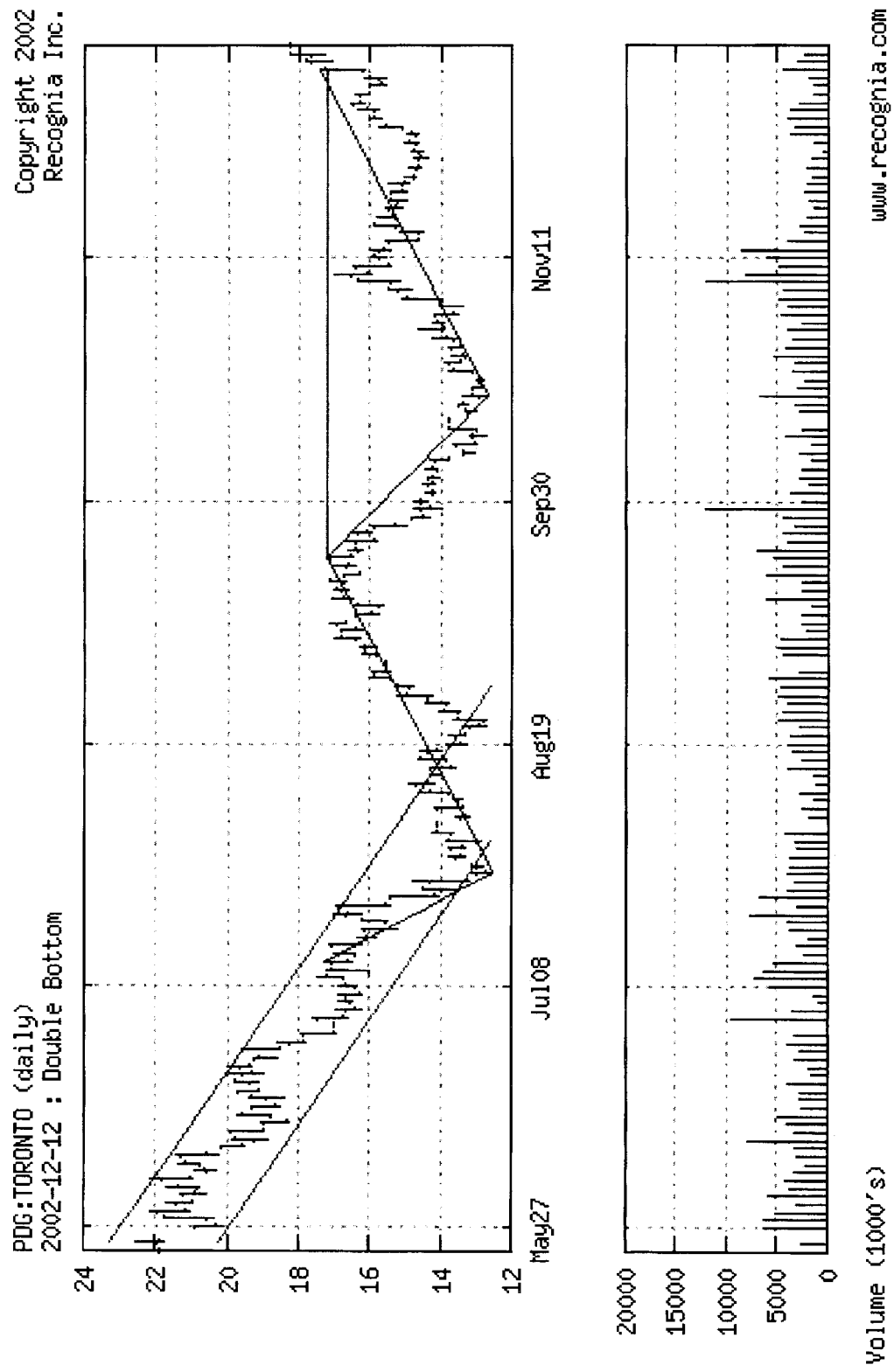
FIG. 4 is a time series chart annotated according to a sample XML markup block contained herein.

An example of an XML markup block determined by API 126 is shown below, and the annotations it defines are shown in FIG. 4:

```
<?xml version="1.0" ?>
<pri>
    <header>
        <api version="2.0000"/>
        <pricing_data>All information copyright respective trademark holders.</pricing_data>
        <authenticated value="true"/>
        <transaction value="263738"/>
        <errors count="0">
        </errors>
        <warnings count="0">
        </warnings>
    </header>
    <markup type="event">
        <list count="8" type="line">
            <line chart="price" type="pattern">
                <start>
                    <date>2002-12-12</date>
                    <price>17.4</price>
                </start>
                <end>
                    <date>2002-10-17</date>
                    <price>12.66</price>
                </end>
            </line>
            <line chart="price" type="pattern">
                <start>
                    <date>2002-10-17</date>
                    <price>12.66</price>
                </start>
                <end>
                    <date>2002-09-19</date>
                    <price>17.19</price>
                </end>
            </line>
            <line chart="price" type="pattern">
                <start>
                    <date>2002-09-19</date>
                    <price>17.19</price>
                </start>
```

-continued

```
        <end>
            <date>2002-07-26</date>
            <price>12.52</price>
        </end>
    </line>
    <line chart="price" type="pattern">
        <start>
            <date>2002-07-26</date>
            <price>12.52</price>
        </start>
        <end>
            <date>2002-07-11</date>
            <price>17.29</price>
        </end>
    </line>
    <line chart="price" type="trend">
        <start>
            <date>2002-05-24</date>
            <price>23.245000</price>
        </start>
        <end>
            <date>2002-12-12</date>
            <price>0.719285714285778</price>
        </end>
    </line>
    <line chart="price" type="trend">
        <start>
            <date>2002-05-24</date>
            <price>20.256428</price>
        </start>
        <end>
            <date>2002-11-21</date>
            <price>0.0771422857143416</price>
        </end>
    </line>
    <line chart="price" type="trend">
        <start>
            <date>2002-05-24</date>
            <price>22.570000</price>
        </start>
        <end>
            <date>2002-07-10</date>
            <price>16.6591176470588</price>
        </end>
    </line>
    <line chart="price" type="boundary">
        <start>
            <date>2002-09-19</date>
            <price>17.19</price>
        </start>
        <end>
            <date>2002-12-12</date>
            <price>17.19</price>
        </end>
    </line>
    </list>
    <list count="2" type="range">
        <range type="date">
            <name>Event</name>
            <start>2002-07-11</start>
            <end>2002-12-12</end>
        </range>
        <range type="date">
            <name>Trend</name>
            <start>2002-05-24</start>
            <end>2002-07-10</end>
        </range>
    </list>
</markup>
</pri>
```

Figure 2:
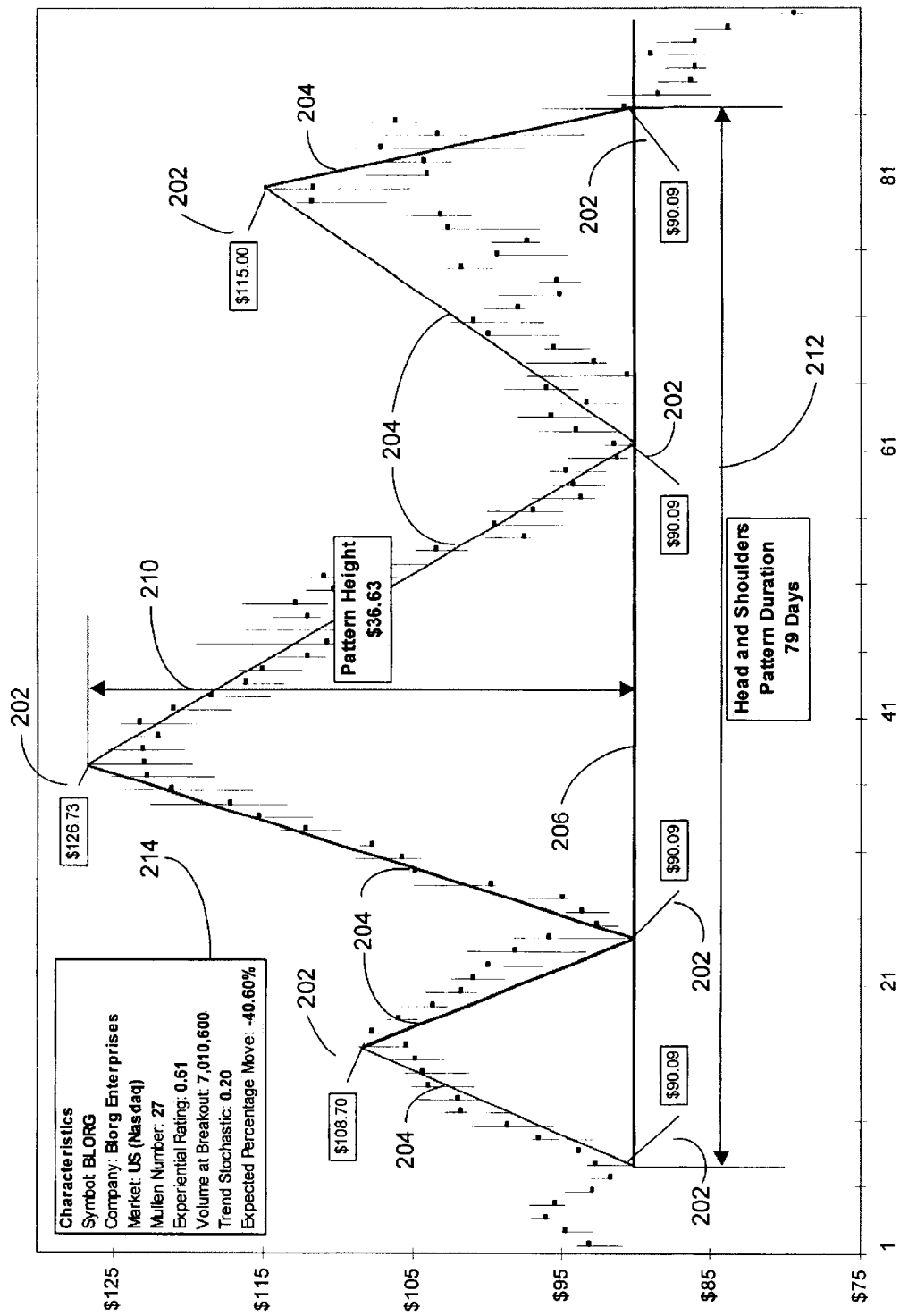
FIG. 2 is a time series chart annotated according to the present invention.

FIG. 2 shows an annotated head and shoulders pattern recognized within a data set. Markup for the pivot points contained within the head and shoulders formation is generated and, in this example, seven pivot points 202 are each labelled with the price at the pivot point. Markup for pattern lines 204 is generated. For example, referring to FIG. 2, the corresponding the lines are drawn between the pivot points 202 to graphically illustrate the head and shoulders pattern formation to a user viewing the annotated chart. Similarly, markup is used to generate further annotations, such as a threshold line typical of a given pattern, shown in this example as neckline 206 linking the bottom pivot points, and the trend line 208. In addition, quantitative annotations, such as the pattern height annotation 210 and the pattern duration 212, can also be generated and added to the chart. Bibliographic and summary information can be provided, as shown in the legend area 214, to identify the chart and provide other statistical and quantitative data, such as the expected price move, and experiential rating or quality of the recognized formation. The result is a chart that presents information to a user in a clear and graphical representation.

Figure 3:
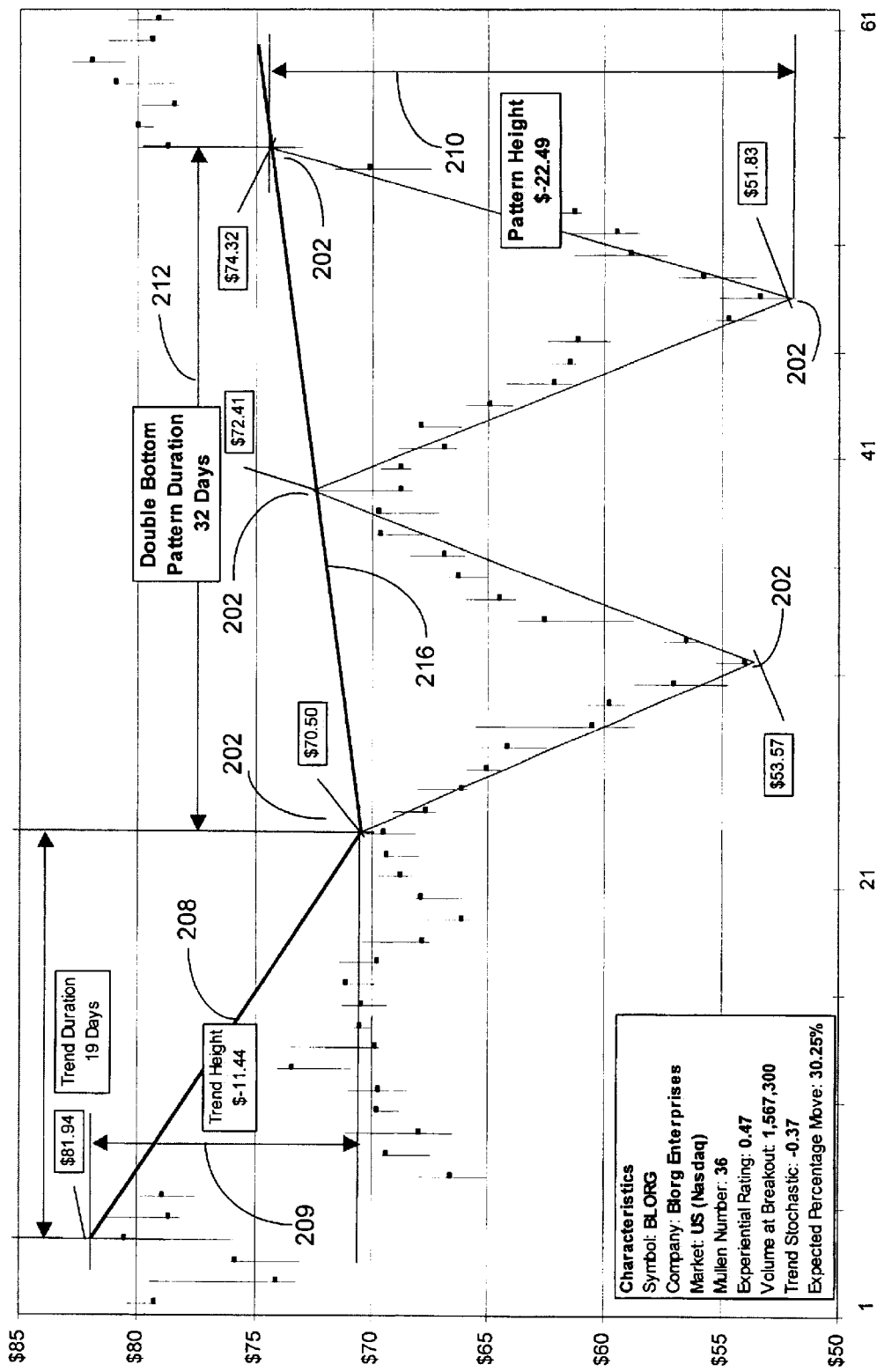
FIG. 3 is a further time series chart annotated according to the present invention.

FIG. 3 shows an annotated double bottom formation. Again, once the double bottom formation is recognized, markup is generated to label the pivot points 202 based on the information associated with the relevant pivot points in the rich feature set. Pattern lines 204 are drawn between the pivot points to clearly reveal the double bottom formation. A threshold line, such as breakout line 216, joins the top pivot points in the formation, and the pattern height 210 and pattern duration 212 are labeled. The legend area 214 is also provided. In addition, the typical downward trend line 208 preceding the double bottom formation is displayed and annotated.

As will be appreciated by those of skill in the art, the present invention permits a markup to be generated for a time series chart, based on a rich feature set determined for the time series. The markup is automatically generated, and can be applied directly to a chart of the time series to annotate the chart. Alternatively, the markup can be further analyzed or modified and presented in some other format, as desired by an end user.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for generating markup for annotating a chart of time series data, wherein a rich feature set of technical event data related to the time series data is stored in a database, the rich feature set including identification of pivot points in the time series data, pattern recognition data derived from the identified pivot points, and rating and quality assessments derived from the pattern recognition data, the identified pivot points and the time series data, the method comprising:

receiving, from a client, a request for markup information related to an event;

selecting features associated with the event from the rich feature set;

determining markup tags in accordance with the selected features;

assembling the markup tags, in accordance with a markup format, to generate a markup block for the event, the markup block containing the requested markup information; and sending the markup block to the client.

2. The method of claim 1, further including, at the client, displaying the time series as a chart, and annotating the chart in accordance with the markup information.

3. The method of claim 2, further including analyzing and manipulating the markup information at the client.

4. The method of claim 1, wherein the request specifies a desired format for the markup information.

5. The method of claim 4, wherein the desired format is selected from XML, SOAP, MS Excel, and MS Word.

6. The method of claim 1, wherein the features are selected in accordance with the request.

7. The method of claim 1, wherein feature selection rules are predetermined in accordance with pattern type and time series data type.

8. The method of claim 1, wherein the markup tags are determined according to markup rules based on pattern type and time series data type.

9. The method of claim 1, wherein assembling the markup tags includes assembling the markup tags in a predetermined hierarchical structure.

10. A method for generating markup for annotating a chart of time series data, wherein a rich feature set of technical event data related to the time series data is stored in a database, the rich feature set including identification of pivot points in the time series data, pattern recognition data derived from the identified pivot points, and rating and quality assessments derived from the pattern recognition data, the identified pivot points and the time series data, the method comprising:

selecting features associated with an event from the rich feature set;

determining markup tags in accordance with the selected features; and assembling the markup tags, in accordance with a markup format, to generate a markup block for the event.

11. A method for annotating a time series chart, comprising:

receiving time series data for pattern recognition;

identifying pivot points in the time series data;

performing pattern recognition based on the identified pivot points to provide pattern recognition data;

characterizing the time series data and rating the pattern recognition data to provide characterization data;

storing, in a database, a rich feature set based on the time series data, the pattern recognition data and the characterization data;

receiving, from an outside client, a request for markup information for a chart based on the time series data;

selecting features from the rich feature set;

determining markup tags in accordance with the selected features;

assembling the markup tags, in accordance with a markup format, to generate a markup block, the markup block containing the requested markup information; and sending the markup block to the client.

12. The method of claim 11, further including, at the client, displaying the chart, and annotating the chart in accordance with the markup information.

13. The method of claim 12, further including analyzing and manipulating the markup information at the client.

* * * * *